June 18, 1935.  A. G. MARANVILLE  2,005,627
AIRPLANE LANDING WHEEL
Original Filed Feb. 6, 1930  4 Sheets-Sheet 1

INVENTOR
Alger G. Maranville
BY
Evans + McCoy
ATTORNEYS

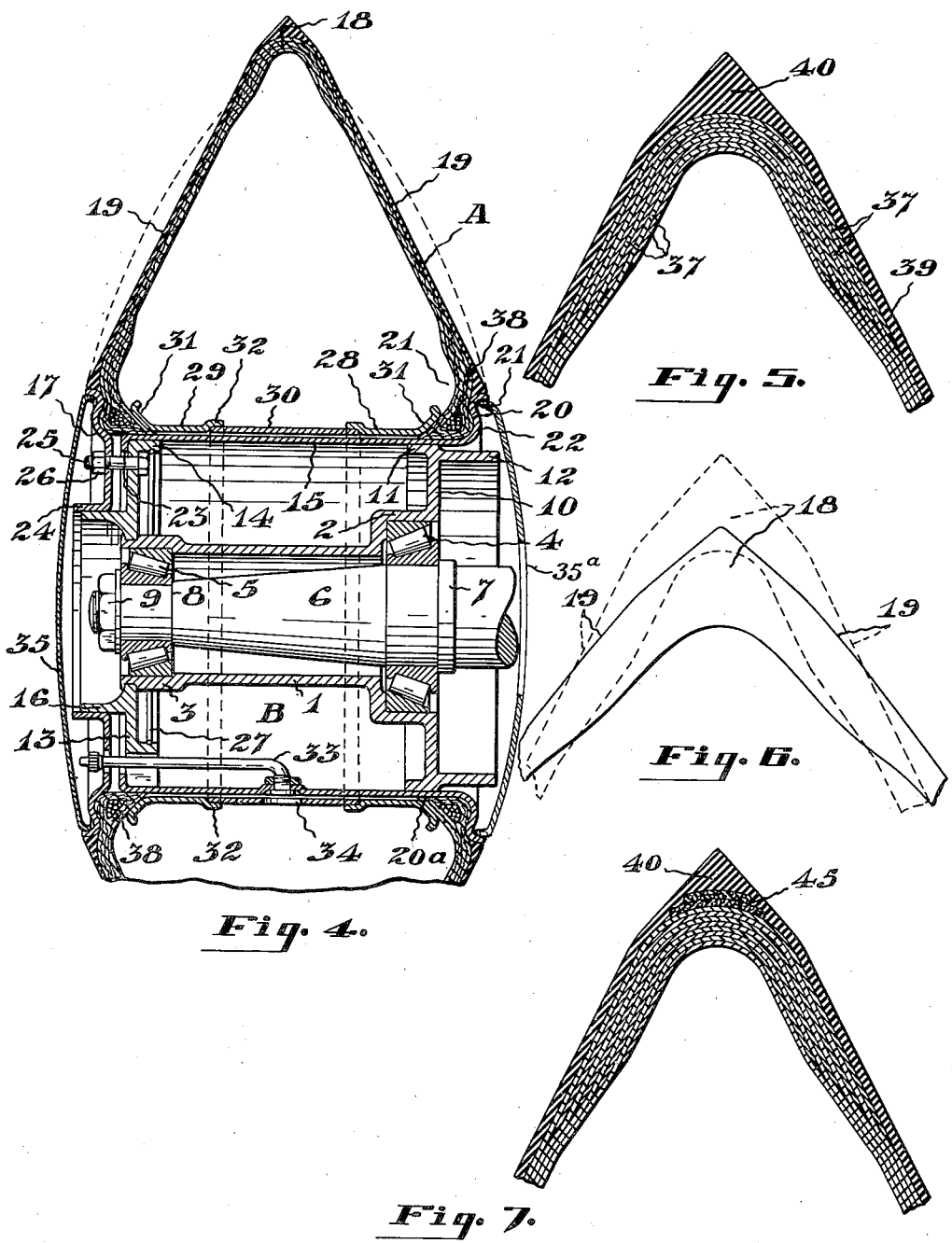

June 18, 1935.  A. G. MARANVILLE  2,005,627
AIRPLANE LANDING WHEEL
Original Filed Feb. 6, 1930  4 Sheets-Sheet 3

INVENTOR
Alger G. Maranville
BY
Evans & McCoy
ATTORNEYS

June 18, 1935.　　A. G. MARANVILLE　　2,005,627
AIRPLANE LANDING WHEEL
Original Filed Feb. 6, 1930　　4 Sheets-Sheet 4
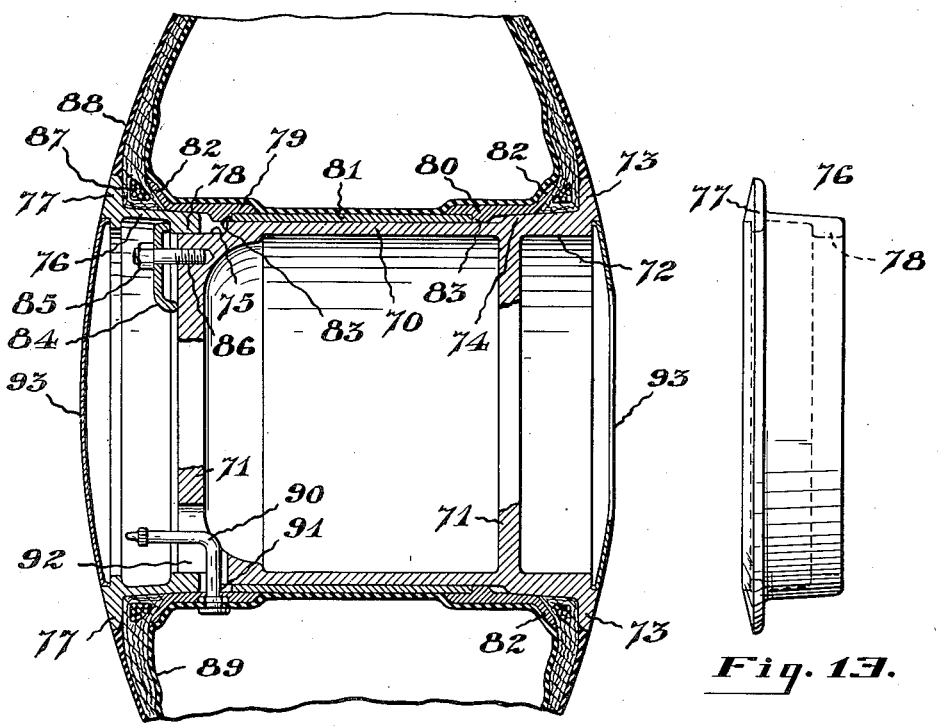
Fig. 11.
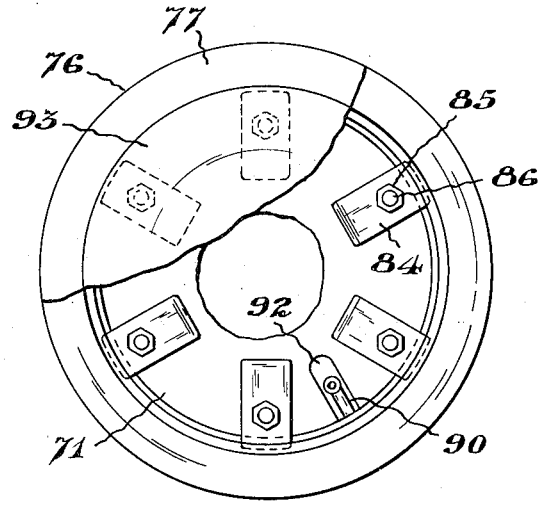
Fig. 12.
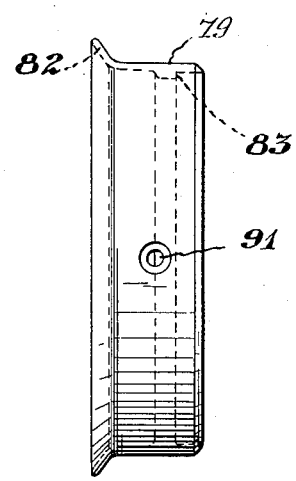
Fig. 13.
Fig. 14.
INVENTOR
Alger G Maranville
BY
Evans & McCoy
ATTORNEYS Patented June 18, 1935

2,005,627

UNITED STATES PATENT OFFICE 2,005,627

AIRPLANE LANDING WHEEL

Alger G. Maranville, Akron, Ohio, assignor to The General Tire & Rubber Company, Akron, Ohio, a corporation of Ohio Application February 6, 1930, Serial No. 426,333
Renewed January 7, 1935

3 Claims. (Cl. 152—29)

This invention relates to aircraft landing wheels and more particularly to means for mounting the pneumatic tires of such wheels.

The type of landing wheel to which the present invention relates is a wheel consisting of a wheel body or hub and a pneumatic tire, the beads of which are clamped to the hub and in which the assembly is so formed that when the tire is inflated the wheel has the form in cross section of an elongated oval, the opposite faces of the wheel body or hub forming continuations of the opposite side faces of the tire, as described and claimed in my co-pending application Serial No. 686,743 filed August 25, 1933.

To obtain a wheel of the form described, it is necessary to provide a tire which is so constructed that when the tire is inflated the tire has an external cross-sectional form such that it will conform to the ends of the oval, the tire having its greatest curvature at the tread and gradually decreasing in curvature from the tread to the beads, so that when mounted upon a hub or wheel body which has convex side faces forming continuations of the side faces of the tire the wheel has an external surface oval in cross section. The tire structure per se is not claimed in the present application, this subject matter being described and claimed in my co-pending application Serial No. 628,869, filed August 15, 1932, which matured in Patent No. 1,969,088, Aug. 7, 1934.

This invention has for its object to provide convenient and economical means for detachably mounting such a pneumatic tire upon a supporting hub and for clamping the beads thereof, to enable the assembly to more adequately withstand braking effort and remove the hazards incient to displaced tire casings caused by the peculiarly severe stresses imposed during the taking off and landing of aircraft.

With the above and other objects in view, preferred embodiments of the present invention are illustrated in the wheel and tire shown in detail and in assembled relation in the accompanying drawings hereinafter described. The illustrated embodiments of the invention are explanatory and are intended to comprehend such variations and modifications thereof as will be apparent to those skilled in the art to which the invention pertains.

In the accompanying drawings,

Fig. 4 is a transverse section of the tire and wheel assembly taken substantially on the line 4—4 of Fig. 1, the contour of the tire when inflated being shown in broken outline;

Fig. 5 is an enlarged transverse section of the tread portion of the tire, showing the tire carcass and tread construction;

Fig. 6 is a diagrammatic section similar to Fig. 5 and showing the contraction of the tire tread and the contour when inflated;

Fig. 7 is a sectional view of the tread portion of a tire casing showing an optional construction wherein a breaker strip is used in conjunction with the overlapped fabric construction shown in Fig. 5;

Fig. 11 is a transverse section through an optional hub and rim assembly for use with the stream-line tire casings shown in Figs. 4 and 9;

Fig. 12 is a side elevation of the structure shown in Fig. 11 taken as looking toward the clamping ring;

Fig. 13 is an edge elevation of the clamping ring shown in Fig. 11;

Fig. 14 is an edge elevation of one of the internal tire mounting rings shown in Fig. 11.

Referring to the accompanying drawings, in which like numerals refer to like parts throughout the several views, the tire and wheel assembly shown in Figs. 1 to 6 inclusive comprises a tire casing A mounted directly on a wheel or hub B.

Figure 1:
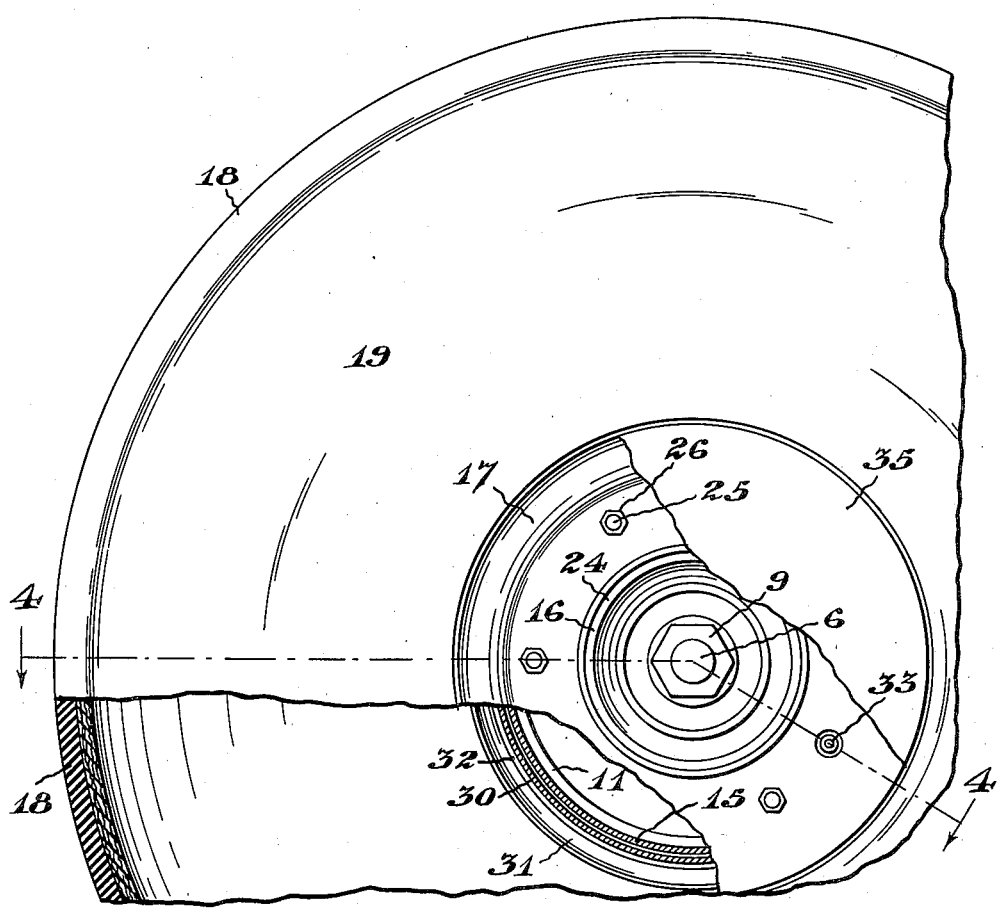
Figure 1 is a side elevation of a portion of a stream-line airplane tire and wheel mounting embodying the invention and shown partially in section and with parts broken away.
Figure 3:
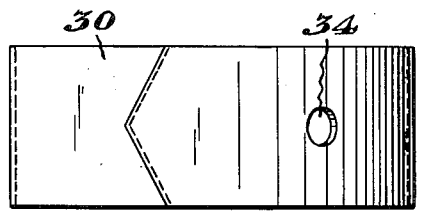
Fig. 3 is an edge elevation of the internal spacer ring for positioning the tire-mounting rings.

The hub B, that is particularly shown in detail in Fig. 4, is provided with a cylindrical bearing receiving portion 1 having enlarged inner and outer ends 2 and 3 which receive suitable opposed thrust bearings 4 and 5. The bearings 4 and 5 each have an inner race ring that is carried by the wheel axle 6. The internal race ring for the bearing 4 is seated against a shoulder 7 that is formed on the axle 6 and the internal race ring for the bearing 5 is seated against a similar shoulder 8 formed at the outer end of the axle 6. The external race rings of the bearings 4 and 5 are similarly seated against internal shoulders formed in the enlarged ends 2 and 3 of the hub portion 1. The hub portion 1 and its associated bearings are held in place by a suitable clamping nut 9 that is threaded onto the outer end of the wheel axle 6 and abutted against the internal race ring of bearing 5.

The inner end of the hub portion 1 has a radially extending web 10 that terminates in a cylindrical flange 11 to provide a seating face for a tire rim member later to be described. The web 10 also carries a transversely extending circumferential flange 12, the radially inner face of which may, if desired, constitute a brake drum of suitable design for use with any suitable brake mechanism (not shown).

An annular plate 13 is secured to the opposite end of the hub portion 1, preferably by means of a press fit and an outwardly rolled lip portion as shown. The plate 13 has a laterally extending circumferential flange 14 that provides a circumferential seating face of slightly less diameter than the seating face provided by the flange 11 previously described. These circumferential flanges 11 and 14 are slightly conical to receive and rigidly support a tire mounting rim 15. The annular plate 13 is formed with a laterally extending intermediate shoulder 16, the outer cylindrical face of which forms a guide for a tire clamping ring 17.

The rim member 15 is preferably of endless rolled stock and is formed with a circumferential flange 22 at its inner edge, which corresponds in shape to a grooved bead portion 20 of the tire later to be described in detail, so that, when the tire is assembled on the rim member 15, the rim flange 22 will closely fit the grooved outer face portion of the tire bead 20, to rigidly clamp the same in place. The opposite edge of the base rim has an inwardly extending radial flange 23 that may seat against the outer face of the hub annulus or plate 13 when the rim member 15 is securely pulled into place by the clamping ring 17 and its associated bolts 25 that extend through the plate 13 and that have nuts 26 that draw the tire and rim assembly into securely clamped position on the hub member. If desired, a split spring ring 27 may be positioned in a groove formed in the inner face of the flange 14 to seat against the bolt heads to prevent the bolts 25 from becoming displaced when the nuts are removed therefrom.

The clamping ring 17 which holds the tire on the rim 15, and also which holds the rim member 15 on the hub B, is preferably endless and is formed with a bead-engaging flange of substantially the shape of the outer face of the associated tire bead. The clamping ring 17 also has a laterally extending guide flange 24 that passes over the shoulder 16 of the plate member 13.

The question of providing a more effective connection between the tire casing and the hub member of aircraft landing wheels is becoming more important with the development of braking equipment for the landing wheels. Aircraft landing gear is subjected to very severe lateral thrusts in landing, which also tends to dislodge the tire beads. These two actions are often simultaneously applied to the tire casing. The present invention contemplates a tire mounting that rigidly clamps each tire bead from each side and permits the use of wire reinforced bead elements, if such are desired, where the tires are subjected to particularly severe service conditions.

The bead spacing and internal bead clamping means comprises a pair of endless bead engaging rings 28 and 29 and a transversely split spacer ring 30. The bead-engaging rings 28 and 29 are each formed with circumferential conical flanges 31 that have substantially the same angularity as the toe portions of the tire beads 20. The edges of the rings 28 and 29 remote from the bead clamping flanges 31 are radially offset to form annular seating shoulders 32 for receiving the edges of the intermediate spacer ring 30. It is thus seen that the tire beads are each rigidly clamped between the endless conical flanges 31 of the rings 28 and 29, and bead engaging flange portion of the base rim member 22 and clamping ring 17. The tire is thus rigidly held against movement relative to the hub when subjected to severe braking or landing stresses, regardless of the degree of inflation of the tire.

The tire B, the construction of which will be now described in detail, is formed with a relatively narrow median tread portion 18. The side walls 19 diverge from the tread 18 to the bead portions 20. The tire casing is of greatest axial width across the bead portions. The beads 20 are each provided with a suitable bead core 38, which lends considerable strength and rigidity to the tire and assists in the secure clamping of the beads to the hub member. The bead portions 20, as particularly shown in Fig. 4, have circumferential grooves 21 formed in the outside faces thereof, somewhat similar to the well known form of clincher type bead. The toe portions 20a of the beads are formed of relatively soft, highly elastic rubber to insure proper sealing of the tire casing by means of the mounting assembly herein described.

Figure 2:
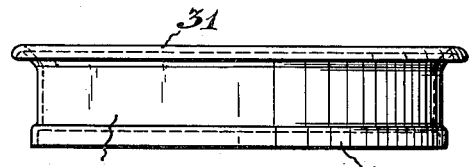
Fig. 2 is an edge elevation of one of the internal tire-mounting rings.

It is not necessary, in the construction shown in Figs. 1 and 2, to employ an inner tube in the tire because of the very effective seal that is provided by rigidly clamping the tire beads 20 on both sides and forcing the same against the base rim 15. The soft bead toes and the application of rubber cement to the contacting parts has been found to give a particularly effective air seal where it is desired to dispense with an inner tube. As shown in Fig. 4, an angle valve 33 is mounted directly in a radially depressed portion of the rim member 15. A suitable opening 34 in the spacer ring 30 overlying the valve base admits air to the tire casing. The stem of the valve 33 extends through suitable openings formed in the disk 13 and clamping ring 17, so that the same is readily accessible by removal of the cover plate 35 that is sprung into position within the clamping ring 17.

The cover plate 35 encloses the ring 17, clamping nuts and other parts of the wheel hub at the outer side and is curved to form a substantial continuation of the curved outer side wall of the tire when the tire is inflated. A similar cap 35a of annular shape may also be provided for the inner side of the tire hub to close the brake drum and to similarly follow out the tire contour.

Before assembling the tire casing on the hub, the endless bead clamping rings 28 and 29 are first inserted within the casing with their marginal bead clamping flanges abutting against the inclined inner walls of the tire beads 20. The transversely split spacer ring 30 is then snapped into place between the rings 28 and 29 with its edges seated against the shoulders 32 to hold the rings 28 and 29 in fixed spaced relationship against the inner faces of the tire beads. The tire casing with the reinforcing rings 28, 29 and 30 inserted therein is next slid onto the rim member 15 which is supported by the disk portions 10 and 13 of the hub. The clamping ring 17 is then put into place and the clamping nuts 26 are threaded onto the bolts to securely clamp the opposite sides of each bead of the tire casing. The bead portions of the tire casing and the contacting face of the rim member 15 are painted with rubber cement or other material to insure air-tight connection between the tire casing and the rim member when pressure of the parts does not give a satisfactory seal.

The tire casing is formed with a compression resisting tread portion 18 which will be now described in detail. When the tire is deflated it has the general appearance shown in Fig. 4. When inflated, it assumes the position shown in broken outline in Fig. 4 and in solid outline in Fig. 6. The walls of the tire in its inflated condition converge in graceful curves toward the median tread portion of the tire to provide the general stream-line contour herein described.

Fig. 5 of the drawings shows an enlarged detail view in cross section of the tire casing. The conical side walls of the tire carcass are joined together at the tread by overlapping the plies of cross woven or suitable cord fabric making up the tire carcass to substantially reinforce the tread portion of the carcass. As shown in Fig. 5, the outer plies 37 are overlapped a substantially greater distance than the inner plies, so that the tread portion of the carcass is gradually thickened from the inside as the median plane of the tire is approached. This arrangement also provides a smooth outer face for the tire casing.

A suitable tread and side wall covering of rubber is applied to the tire carcass formed as just described and, at the median tread portion 40 the rubber is considerably thickened with the opposite sides thereof preferably intersecting each other along the median plane of the tire to complete the stream-lining of the tire casing. The degree of convergence of the sides of the nose 40 is slightly greater than the side walls 19 of the tire, so that when the tire is inflated and the side walls curved outwardly, a substantially uniform curve of the outer surface of the tire is provided, as digrammatically shown in Fig. 6.

The substantial thickening of the tire carcass and the tread portion over the median zone of the tire effectively resists circumferential compression of this portion of the tire casing and thereby resists the tendncy of the side walls to take on circular cross sectional form when the tire is inflated. On the other hand, the thickening of these portions of the casing does not impair the operation of the tire for aircraft use. It will be appreciated that inflation of the tire casing causes the sloping side walls of the casing to pull radially inwardly on the tread portion and to materially compress it circumferentially. The double thickness of fabric plies at the narrow median tread portion effectively strengthens the tire and forms an internal reinforcement throughout the circumference of the median tread portion, thereby tending to hold the tire in proper stream-line shape and also causing a part of the load taken on the tire in landing to be transmitted to the upper portion of the casing by compression of the thickened tread portion and there absorbed by tension on the side walls of the casing, thus further increasing the load sustaining properties of the tire.

Figure 8:
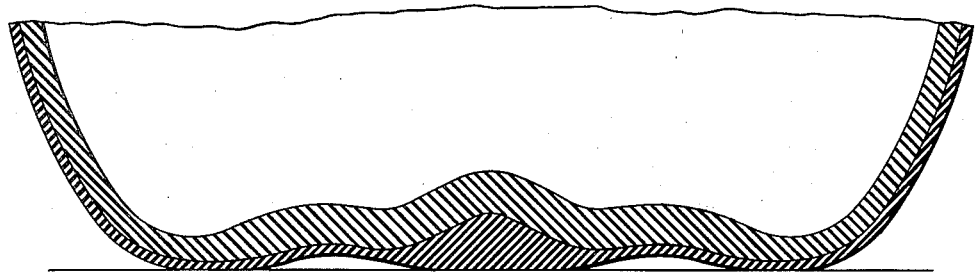
Fig. 8 is a partially diagrammatic transverse section of the inflated tire taken under load and showing the three-point ground contact of the improved tire casings.

When tires of the type just described are in operation, that is, supporting the weight of the plane, they assume a shape somewhat like that shown in Fig. 8. It is seen in this view that a greatly increased area of contact between the tire and supporting surface is provided. The narrow central tread portion of the tire carries a considerable portion of the supported weight to the opposite side of the casing. The portions adjacent the tread portion also enlarge the ground contact area very rapidly with increased deflection and thus absorb the landing impact with a minimum of shock and rebound. The relatively large volumetric air displacement of tires of the construction herein proposed reduces rebound and increases load sustaining properties of the tire with obvious advantages.

Referring to Fig. 7, a suitable two ply cord breaker strip 45 is shown adjacent the overlapped fabric plies 37 in the median tread portion 40 of the tire. This breaker strip may be employed in those constructions where it is desired to have a more rigid tread reinforcement.

Figures 9, 10:
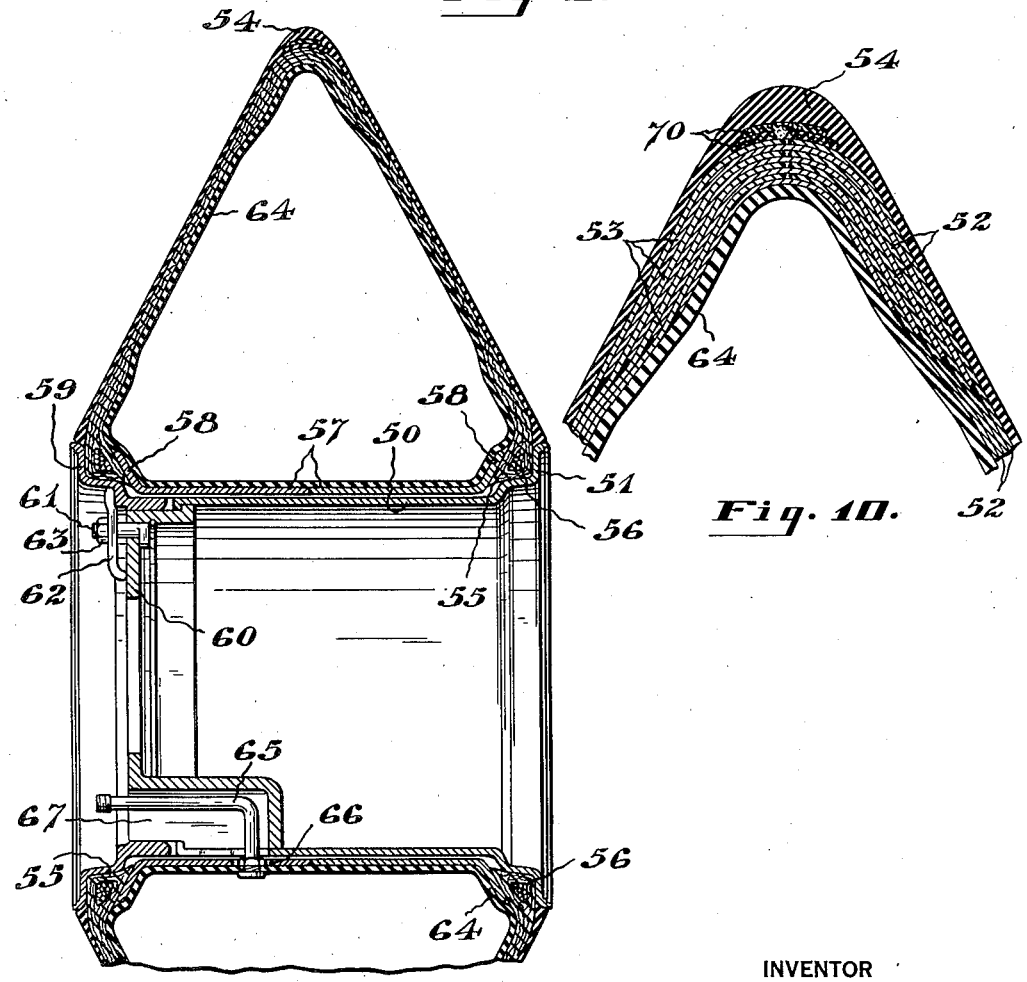
Fig. 9 is a transverse section through an optional stream-line tire and hub assembly, showing the invention applied to a tire casing embodying a separate inner tube and rigidly clamped straight side bead portions of the wire reinforced type.
Fig. 10 is an enlarged transverse section of the outer portion of the tire shown in Fig. 9, showing the carcass construction.

Figs. 9 and 10 show a similarly stream-lined, large air capacity tire of slightly different construction. The hub portion of the landing wheel in this construction is preferably similar to the type previously described, although it may be of any other suitable type, and need not be described herein. The rim member 50 of this construction is similar to the rim member previously described, except that it is provided with a straight side flange 51 at its inner circumferential edge.

The tire carcass in this construction is built up by butt-joining the fabric plies 52 and separating the plies by suitable breaker strips 53 of crosswoven or cord fabric which are positioned over the circumferential edges of the meeting fabric and which assist in resisting circumferential compression of the median tread portion of the tire casing when it is inflated. The median tread portion of this tire is drawn in in the manner previously described. If desired, a suitable two-ply cord breaker strip 70 may be incorporated in the nose of the tire adjacent the uppermost plies of fabric. The tread of the tire is formed with a rounded nose 54 in lieu of the sharper nose 40 of the previously described tire casing. The beads 55 of the tire are reinforced by suitable bead reinforcing elements of wire or fabric. Conventional straight side beads are used in this tire casing.

The tire shown in Fig. 9 is provided with an internal reinforcing member comprising a pair of abutted endless rings 57, each having an outwardly inclined bead engaging flange 58 which seats against the inclined inner face of the corresponding tire bead 55. The clamping ring 59 which holds the tire casing in position, is carried by an annular guide portion 60 of the hub and seats against the straight outer side of the outermost tire bead 55.

The annular portion 60 of the hub is provided with suitable clamping bolts 61 that extend therethrough and which carry clamping lugs 62 that engage the outer side of the clamping ring 59. Suitable nuts 63, threaded onto the bolts, serve to draw the clamping ring 59 inwardly toward the tire to rigidly clamp the tire beads 55 on both sides of each bead so that the tire will not move relative to the hub even under the most severe operating conditions.

An inner tube 64 is shown in the tire casing here illustrated. A suitable valve member 65, which extends through an opening 66 in the outermost reinforcing ring 57 and out through a suitable depression 67 formed in the hub annulus portion 60, serves to inflate the tire.

The modified tire shown in Figs. 9 and 10, when inflated, functions in the same manner as the tire A previously described, and is stream-lined to materially lessen the wind resistance.

Figures 11 to 14 inclusive show an optional hub and tire mounting for use with stream-line tire casings of the type previously described. The hub 70, shown in Fig. 11, is of cylindrical shape and is provided with a pair of spaced inwardly extending radial webs 71, the inner of which is preferably spaced inwardly from the adjacent end of the hub to provide a suitable braking surface 72. The braking surface 72 provides sufficient area so that suitable braking mechanism can be used to cooperate therewith. If desired, the outer plane side of the inwardly positioned web may be used as a braking surface when a disk brake is employed.

The webs 71 are provided with suitable portions (not shown) for the reception of suitable axle bearings (not shown).

The cylindrical hub 70 is formed with bead engaging flange 73 of substantially the same shape as the associated tire bead, and with an outwardly offset circumferential portion 74 which is tapered from the flange 73 toward the opposite end of the hub. The end of the portion 74, as shown, preferably forms a substantial shoulder with the body of the hub 70.

The opposite end of the cylindrical hub 70 is preferably reduced in diameter to provide a suitable guide and bearing surface 75 for the clamping ring 76.

The clamping ring 76 which holds the tire on the hub 70 is preferably endless and is formed with a bead engaging flange 77 of substantially the shape of the outer face of the associated tire bead. The outer circumferential surface of the clamping ring 76 is tapered from the flange 77 toward the opposite side of the hub and is of substantially the same mean diameter as the portion 74 at the opposite side of the hub. The clamping ring 76 also has a laterally extending thickened flange 78 that passes over the guide face or shoulder 75 of the hub 70.

This construction also embodies a bead spacing and internally clamping means for rigidly clamping each tire bead from each side. The bead spacing and internal clamping means comprises a pair of endless bead-engaging rings 79 and 80 and a transversely split spacer ring 81. The bead-engaging rings 79 and 80 are each formed with circumferential conical flanges 82 that have substantially the same angularity as the toe portions of the tire beads. The inner circumferential faces of the rings 79 and 80 adjacent the flanges 82 thereof are tapered to substantially the same degree as the tapered faces of the clamping ring 76 and portion 74. The inner circumferential face of each ring is also formed with a substantial circumferential shoulder 83 intermediate its edges. The shoulders 83 of the rings 79 and 80 provide abutments or annular seating shoulders for receiving the edges of the intermediate spacer ring 81.

The tapered face of the ring 80, when the construction is assembled, seats upon the tapered face of the hub portion 74. Similarly, the tapered face of the ring 79 seats upon the tapered face of the tire clamping ring 76 which is supported by the hub shoulder 75. The shoulders 83 of the rings 79 and 80 and the spacer ring 81 also firmly seat upon the cylindrical body portion of the hub 70.

The clamping ring 76 is held in position by suitable lugs 84 and nuts 85 which are threaded onto studs 86 carried by the hub 70. The tire beads 87 of a suitable tire 88 are each rigidly clamped between the endless conical flanges 82 of the rings 79 and 80, and the bead engaging flange portions of the clamping ring 76 and cylindrical hub 70.

The tire 88 is provided with an inner tube 89, the valve 90 of which preferably extends through an opening 91 in the outermost ring 79 and a recess 92 formed in the hub portion 70.

As in the previously described construction, shown in Fig. 4, the hub is also provided with suitable curved cover plates 93 at its ends to form substantial continuations of the tire side walls.

In the optional hub construction just described, the base rim for the tire forms an integral part of the hub, and the tapered portion of the hub and tapered clamping ring form substantial supports and clamping means for the tire and tire bead spacing rings.

In the foregoing description and in the appended claims, the term "fabric" is intended to describe any desirable material from which the tire carcass is formed, such as the conventional cross-woven or cord fabric or other material.

Aside from the specific embodiments of the invention herein shown and described, it will be understood that numerous details of the construction may be altered or omitted without departing from the spirit and scope of this invention. It is not my desire to limit the invention to the exact construction shown and described but it is my desire to claim the invention broadly as well as specifically, as indicated in the appended claims. It will also be apparent to those skilled in the art that the invention is capable of use on automotive equipment, such as automobiles and the like, as well as on aircraft.

What I claim is:

1. A wheel assembly comprising a stream-line pneumatic tire having a relatively narrow tread portion and elongated side walls diverging from the tread portion, a hub having means at the opposite ends thereof for clamping the tire, said hub having end faces forming continuations of the side walls of the tire.

2. A wheel assembly comprising a hub, a base rim carried by said hub, a stream line tire mounted on said rim comprising a relatively narrow tread and side walls having edge beads and converging from said beads to said tread, said tire being substantially of maximum axial width adjacent said beads, means within said tire extending between and abutting against the inner sides of said beads, and means engaging the outer faces of said beads for securely clamping said beads against said means within said tire, and means at each side of said hub substantially closing in the space within said beads to form substantial continuations of said side walls.

3. A wheel assembly comprising a hub, a rim carried by said hub, a stream-line tire mounted on said rim comprising a relatively narrow tread and side walls having edge beads and converging from said beads to said tread, means within said tire extending between and abutting against the inner sides of said beads, means engaging the outer faces of said beads for securely clamping said beads against said means within said tire to render said tire fluid tight, means at opposite ends of said hub substantially closing in the space within said beads and forming substantial continuations of said side walls, and valve means carried by said rim for admitting air to and preventing the escape of air from said tire.

ALGER G. MARANVILLE.